Aug. 26, 1941.    G. SUNDBACK    2,253,822
MOLDING APPARATUS
Filed June 15, 1938    2 Sheets-Sheet 1

INVENTOR.
Gideon Sundback
BY Kelley & Chisholm
ATTORNEYS.

Aug. 26, 1941.   G. SUNDBACK   2,253,822
MOLDING APPARATUS
Filed June 15, 1938   2 Sheets-Sheet 2

INVENTOR.
*Gideon Sundback*
BY *Kelley & Chisholm*
ATTORNEYS.

Patented Aug. 26, 1941

2,253,822

UNITED STATES PATENT OFFICE 2,253,822

MOLDING APPARATUS

Gideon Sundback, Meadville, Pa., assignor to Talon, Inc., Meadville, Pa., a corporation of Pennsylvania Application June 15, 1938, Serial No. 213,846

7 Claims. (Cl. 18—30)

This invention relates to molding apparatus. The primary object of the invention is to provide an improved molding apparatus especially for use in connection with plastic materials which will enable a series of relatively small moldings to be made at a rapid rate. The invention will therefore materially reduce the cost of molding such an article as a slide fastener stringer in which it is necessary to have a large number of closely spaced separate moldings on the edge of a fabric stringer.

The problem in molding small articles such as slide fastener coupling members economically from plastic material, has arisen because of the necessary time element involved in each molding operation. It is highly desirable for mechanical reasons to mold only one element at a time and in the case of thermoplastic materials as well as those of the thermosetting class, it is necessary to maintain an injection or compression pressure until the material hardens to a substantial degree. According to my invention I provide means independent of the injection pressure for maintaining pressure and reducing the volume in each mold cavity after withdrawal of the injection pressure. The same injection means may be used to mold a series of articles in rapid succession while the necessary compression of the molded part is maintained for the desired time interval after the injection.

In the accompanying drawings I have shown for purposes of illustration two embodiments which my invention may assume in practice. In the drawings.

Figure 1:
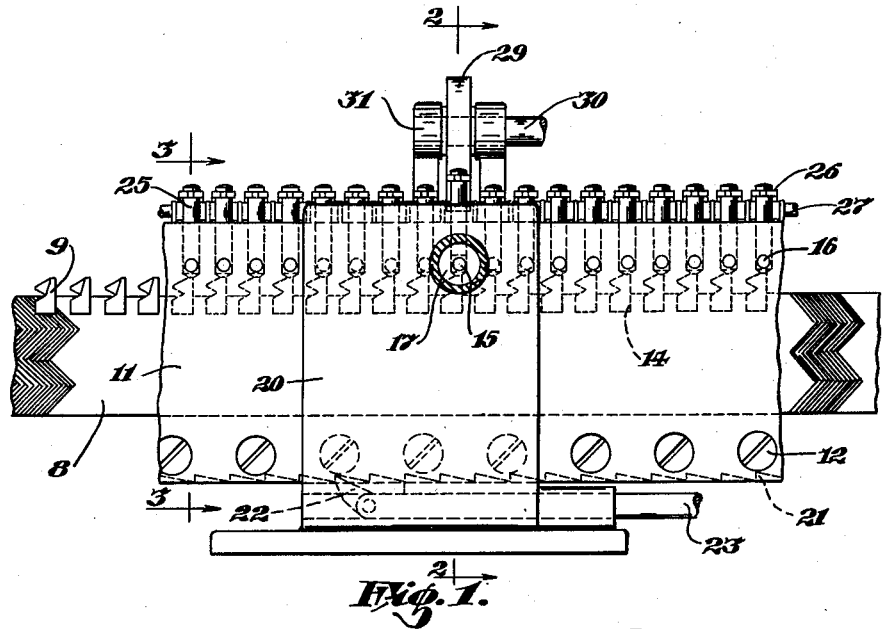
Fig. 1 is a side view of a portion of my improved molding apparatus with the injection nozzle shown in section.
Figure 2:
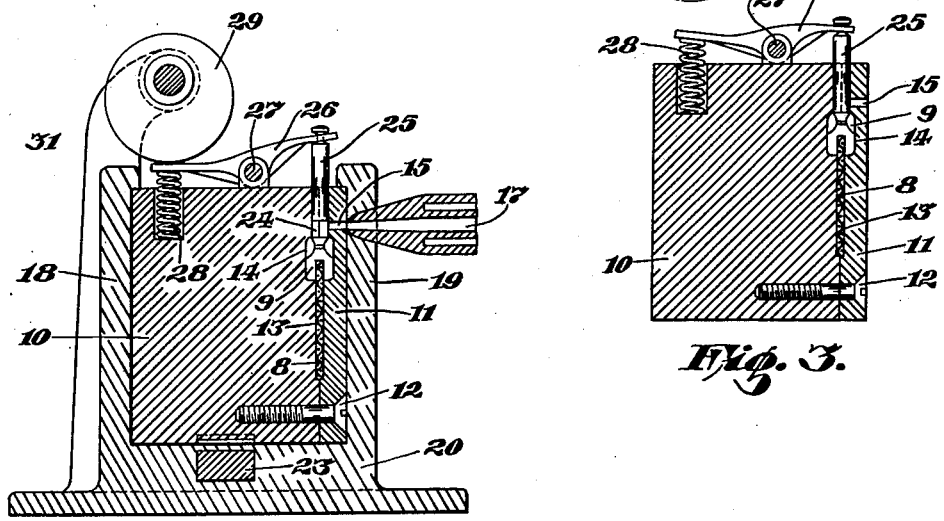
Fig. 2 is a cross-section on line 2—2 of Fig. 1.
Figure 3:
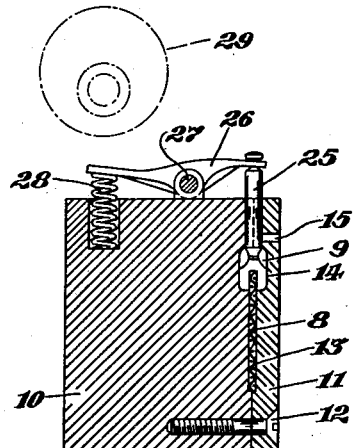
Fig. 3 is a cross-section on line 3—3 of Fig. 1.

In Figs. 1, 2 and 3 the invention is illustrated with a design of mold parts adapted for the manufacture of a slide fastener stringer. Such a stringer comprises the fabric tape 8, having a series of closely spaced like fastener elements 9. The shape of the fastener elements can be of any well known form. If it is desired to produce one of the conventional types on the market having a recess on one side opposite a projection on the other, such recesses can be drilled after the molding operation or they can be molded in by core members which are not illustrated in this case.

The mold parts 10 and 11 can be held together by any suitable mechanical means such as screws 12. When so held they provide a space 13 suitable for holding the tape 8 and a series of mold cavities 14. The mold cavities communicate with a passageway 15 by a series of aligned openings 16 on the side surface of the mold parts. Injection means including a suitable injection nozzle 17 are provided, the injection nozzle being supported in alignment with a series of openings 16. The mold parts are mounted for rectilinear movement as a whole in a guideway formed by the vertical walls 18, 19 which are a part of the base 20. Any suitable mechanical means may be employed for advancing the mold parts stepwise to bring the openings 16 successively in register with the injection nozzle 17. For example, I have indicated a rack 21 on the bottom of the mold parts and a pawl 22 movable back and forth by suitable mechanical means including a rod 23.

In communication with each mold cavity and preferably formed in the mold parts themselves is a cylinder 24 which intersects the passage 15. A series of plungers 25 are mounted for up and down movement in the cylinders 24 and each plunger has connected thereto a rocker arm 26 pivoted at 27 upon which acts a coil spring 28. This normally exerts a force upon the plunger tending to move it toward the mold cavity. This whole series of plungers, rocker arms and springs, of course, advances with the mold parts. Mechanical means is provided for lifting each of the plungers just prior to the injection of the material into the corresponding mold cavity. In the embodiment illustrated, this comprises a cam 29 on a shaft 30 mounted in suitable brackets 31, the cam being driven by any suitable source of power in properly timed relation with the movement of the pawl 22 which actuates the mold parts. Preferably the timing is such that the cam will begin to bear upon the rocker arm 26 before the movement is completed, so that no time is lost and as soon as the mold parts have been moved to the proper position the constant injection pressure on the nozzle 17 will force material into the mold cavity. Immediately after a sufficient time has elapsed for the mold cavity to be substantially filled, the mold parts are moved to the next station whereupon the rocker arm moves out from under the cam 29 and the spring 28 causes a heavy force to be exerted upon the plunger 25. The downward movement of the plunger 25 will then immediately cut off communication with the injection means and at the same time, substantial pressure will be maintained upon the material in the mold cavity. Further movement of the plunger is allowed to take care of the compression and reduction of volume of the material in the mold cavity. The extent of this movement, of course, depends upon the nature of the material being molded.

Figure 4:
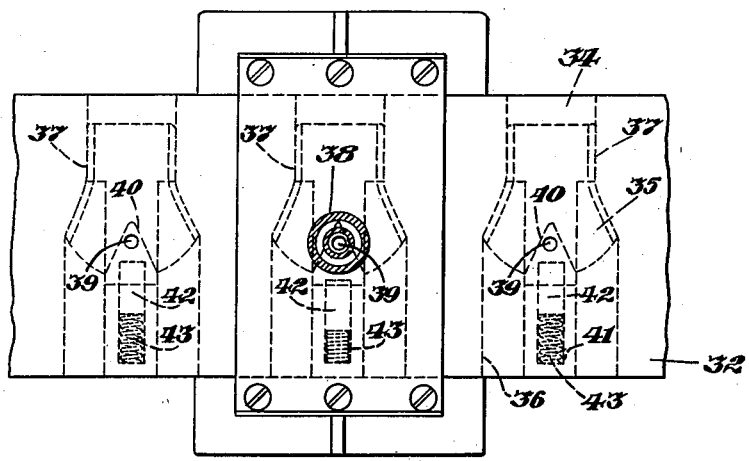
Fig. 4 is a top plan view of a modified form of apparatus.
Figure 5:
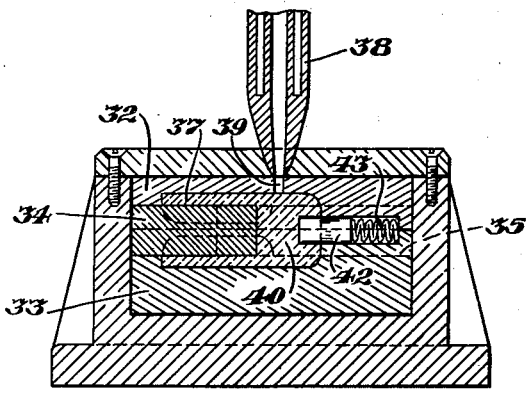
Fig. 5 is a vertical cross-section through the apparatus shown in Fig. 4.

Figs. 4 and 5 show an embodiment of my invention which may be applied for example to molding of sliders for slide fasteners. In this embodiment there is provided any suitable form of separable mold parts 32, 33 respectively. These mold parts have die cavities and removable core parts 34, 35, 36 for forming the slider body 37. Moldable material is injected into the mold cavities from a nozzle 38, through a port 39 formed in one of the die parts. A plurality of slider forming dies may be formed in series and are filled with moldable material as the respective ports 39 are successively brought into register with the injection means. Between the die parts and in line with the wedge portion 40 of the slider is formed a cylinder 41. Positioned within the cylinder is a plunger 42 and a spring 43 for urging the plunger outwardly from the cylinder and into the wedge part of the slider. In this embodiment when the port 38 is in alignment with the injection nozzle moldable material is forced into the die cavities and against the plunger 42. Because the injection pressure is greater than the spring force against the plunger it will be pushed back until a forward movement of the die assembly cuts off the injection pressure. At this instant spring 43 causes a heavy force to be exerted upon the plunger 42 sufficient to force the plunger an appreciable distance into the outer end of the slider wedge. This movement of the plunger takes care of the compression and reduction of volume of the material in the mold cavity in the same manner as the plunger in the first described form of my invention. In some cases also a spring pressed plunger may be employed to advantage even when the injection port is left after withdrawal of the nozzle because the material in the passage 39 will quickly harden enough to prevent back flow.

While I have shown and described in this application two embodiments which my invention may assume in practice, it will be understood that these embodiments are merely for the purposes of illustration and that other forms may be devised within the scope of my invention as set forth in the appended claims.

What I claim as my invention is:

1. Injection molding apparatus of the class described comprising injection means for the moldable material including a nozzle, a mold movable relatively to the nozzle, said mold having a mold cavity of substantially the shape of the article to be molded, a passageway leading from the mold cavity to an exterior surface of the mold and movable into and out of communication with said nozzle upon relative movement between said mold and nozzle, and means for exerting pressure on the material in the mold cavity when the mold is not in communication with the nozzle, said means comprising a cylinder carried by the mold and communicating with the mold cavity, a plunger in the cylinder and means for exerting yielding force on said plunger to move it in said cylinder toward the mold cavity.

2. Injection molding apparatus of the class described comprising the combination defined in the preceding claim wherein said means for exerting a yielding force includes a spring acting on the plunger normally tending to move it toward the mold cavity.

3. In molding apparatus the combination of mold parts movable as a unit and having a series of mold cavities therein, and a series of passages each having an opening on one side of the mold parts, the openings for all of said passages being aligned one passage leading to each mold cavity, stationary means adapted to register in turn with said openings for injecting material through the passages to fill the mold cavities in succession, a series of plungers carried by the mold parts one communicating with each mold cavity, and means for exerting a force on said plungers after movement of the corresponding openings from said stationary means.

4. In molding apparatus the combination of mold parts having a series of mold cavities therein, and a series of passages with aligned openings on one side of the mold parts, one passage leading to each mold cavity, means adapted to register in turn with said openings for injecting material through the passages to fill the mold cavities in succession, and a series of cylinders each with a plunger therein carried by the mold parts, one cylinder communicating with each mold cavity, and means for moving the mold parts stepwise past the injection means, mechanical means for withdrawing the plunger for each cylinder just prior to the time of injection, and means including a spring for returning said plunger toward the mold cavity and exerting force on the material therein after movement of the mold cavity out of registration with the injection means.

5. Injection molding apparatus of the class described comprising means for injecting the moldable material including a nozzle, a mold having a mold cavity substantially the same shape as the shape of the article to be molded, a passageway leading from the mold cavity to an exterior surface of the mold, said mold being movable relatively to the nozzle to bring said passageway into or out of registry with said nozzle whereby the mold cavity is filled during registry of said passageway with the nozzle and cut off from the injection pressure when out of registry with said nozzle, and means carried by said mold and movable therewith relative to the injection nozzle for maintaining pressure on and tending further to reduce the volume of the material in the mold cavity for a substantial time after the injection pressure has been cut off.

6. Injection molding apparatus of the class described comprising a mold having a large number of mold cavities in closely spaced relation therein, a separate passageway for each mold opening through one surface of the mold, the openings for all the passageways being aligned, a guideway for said mold having a guide surface bearing against the surface containing said openings, an injection nozzle having a passageway leading through said guideway and adapted to register in turn with said openings, means for moving said mold in said guideway to bring said openings in turn into registry with the injection nozzle, the surface of said guideway adjacent the said openings acting as a valve to seal off a mold cavity when its passageway moves out of registry with the injection member, and means carried by the mold and movable relatively thereto for exerting pressure on the material in said mold cavity for a substantial time interval after the mold cavity is thus sealed off.

7. Injection molding apparatus as defined in claim 6 wherein the means for exerting pressure on the material after the mold cavity is sealed off from the injection nozzle comprises a row of cylinders in the mold one communicating with each mold cavity, a separate plunger for each cylinder, means including a spring for normally urging said plunger inwardly toward the mold cavity, and means for automatically holding each plunger retracted against the compression of the spring while the mold cavity with which said plunger cooperates is in registry with the injection nozzle.

GIDEON SUNDBACK.